(12) United States Patent
Sasaki et al.

(10) Patent No.: US 8,794,848 B2
(45) Date of Patent: Aug. 5, 2014

(54) OPTICAL MODULE

(71) Applicant: Fujitsu Optical Components Limited, Kawasaki (JP)

(72) Inventors: Kazuya Sasaki, Yokohama (JP); Yasuo Tanaka, Chigasaki (JP)

(73) Assignee: Fujitsu Optical Components Limited, Kawasaki (JP)

( * ) Notice: Subject to any disclaimer, the term of this patent is extended or adjusted under 35 U.S.C. 154(b) by 0 days.

(21) Appl. No.: 14/040,919

(22) Filed: Sep. 30, 2013

(65) Prior Publication Data

US 2014/0029895 A1 Jan. 30, 2014

Related U.S. Application Data

(63) Continuation of application No. PCT/JP2011/058360, filed on Mar. 31, 2011.

(51) Int. Cl.
*G02B 6/36* (2006.01)

(52) U.S. Cl.
USPC .............................................. 385/53; 385/92

(58) Field of Classification Search
USPC .......................................................... 385/53
See application file for complete search history.

(56) References Cited

U.S. PATENT DOCUMENTS

| | | | | |
|---|---|---|---|---|
| 7,513,693 B2 * | 4/2009 | Wang | ............................... | 385/56 |
| 2005/0003697 A1 | 1/2005 | Neer et al. | | |
| 2005/0196109 A1 | 9/2005 | Kim et al. | | |
| 2008/0314099 A1 | 12/2008 | Yu | | |
| 2009/0211801 A1 | 8/2009 | Edwards et al. | | |

FOREIGN PATENT DOCUMENTS

| | | |
|---|---|---|
| JP | 2005-522853 | 7/2005 |
| JP | 2006-154594 | 6/2006 |
| JP | 2006-337727 | 12/2006 |
| JP | 2007-522530 | 8/2007 |
| JP | 2009-025791 | 2/2009 |
| JP | 2009-199083 | 9/2009 |

OTHER PUBLICATIONS

International Search Report mailed Jun. 7, 2011 in corresponding International Patent Application No. PCT/JP2011/058360.
International Preliminary Report on Patentability, dated Oct. 10, 2013, in corresponding International Application No. PCT/JP2011/058360 (13 pp.).

* cited by examiner

*Primary Examiner* — Omar Rojas
(74) *Attorney, Agent, or Firm* — Staas & Halsey LLP (57) ABSTRACT

An optical module includes a rotating bail disposed on a front part of a case that is inserted into and removed from a cage; a slide plate that slides along a longitudinal direction of the case in conjunction with rotation of the bail; and an engagement member is disposed on the slide plate, freely engages with an engagement member of the cage, and is released from an engaged state by a sliding of the slide plate in conjunction with the rotation of the bail. The bail and the slide plate are formed by an integrated metal plate in a folded state.

9 Claims, 14 Drawing Sheets

OPTICAL MODULE

CROSS REFERENCE TO RELATED APPLICATIONS

This application is a continuation application of International Application PCT/JP2011/058360, filed on Mar. 31, 2011 and designating the U.S., the entire contents of which are incorporated herein by reference.

FIELD

The embodiments discussed herein are related to an optical module that is detachable from a cage.

BACKGROUND

An industry standard (hereinafter, Multi Source Agreement (MSA)) pluggable optical module is increasingly employed and has interfaces such as an external form and characteristics prescribed. This pluggable optical module enables the optical module to be inserted into and removed from a case (cage), and is demanded to have a simple cage shape and favorable assemblability, and to enable easy attachment and detachment with respect to the case. The optical module includes an optical transceiver, for example.

The optical module has an insertion/detachment port disposed in a front part and the front part of the optical module has a bail freely rotatably disposed for insertion/detachment operation of the optical module into/from the case. The optical module is removed from the cage by holding and pulling out a bail portion. The optical module is attached to the cage by pushing in the optical module toward the cage.

An engagement function is configured to work in conjunction with rotation of the bail and, when the optical module is attached to the cage, the bail is rotated to a position (attachment position) with the front part of the opening module opened, thereby engaging an engaging unit of the case and an engaging unit of the optical module with each other to fixedly hold the optical module in the cage. On the other hand, when the optical module is removed, the bail is rotated to a horizontal position (removal position) parallel to the optical module, thereby releasing the engagement between the cage and the engaging unit of the optical module so that the case can be removed from the optical module.

For such an optical module, a technique has been disclosed that gives a biasing force to the rotation of the bail by disposing an attaching/detaching mechanism such as a spring and a cam so as to fixedly hold the optical module to the cage while the bail is rotated to the attachment position (see, for example, Published Japanese-Translation of PCT Application, Publication Nos. 2007-522530 and 2005-522853).

However, a conventional attaching/detaching mechanism has a large number of components, which makes component cost high, and cannot easily be assembled. For example, since a bail and an engaging unit are different components, the dimensional tolerances of the components and the degrees of bending of the components affect assembly accuracy between the components, making improvement in yield difficult. Variation of assembly accuracy prevents the rotating state of the bail and the engaged state in the engaging unit from interlocking as designed, which may destabilize the engaged state of the optical module with the cage. Since a spring and a cam are necessary for the attaching/detaching mechanism, it takes time to incorporate these components.

SUMMARY

According to an aspect of an embodiment, an optical module includes a rotating bail disposed on a front part of a case that is inserted into and removed from a cage; a slide plate that slides along a longitudinal direction of the case in conjunction with rotation of the bail; and an engagement member is disposed on the slide plate, freely engages with an engagement member of the cage, and is released from an engaged state by a sliding of the slide plate in conjunction with the rotation of the bail. The bail and the slide plate are formed by an integrated metal plate in a folded state.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be described in detail with reference to the accompanying drawings.

Figure 1:
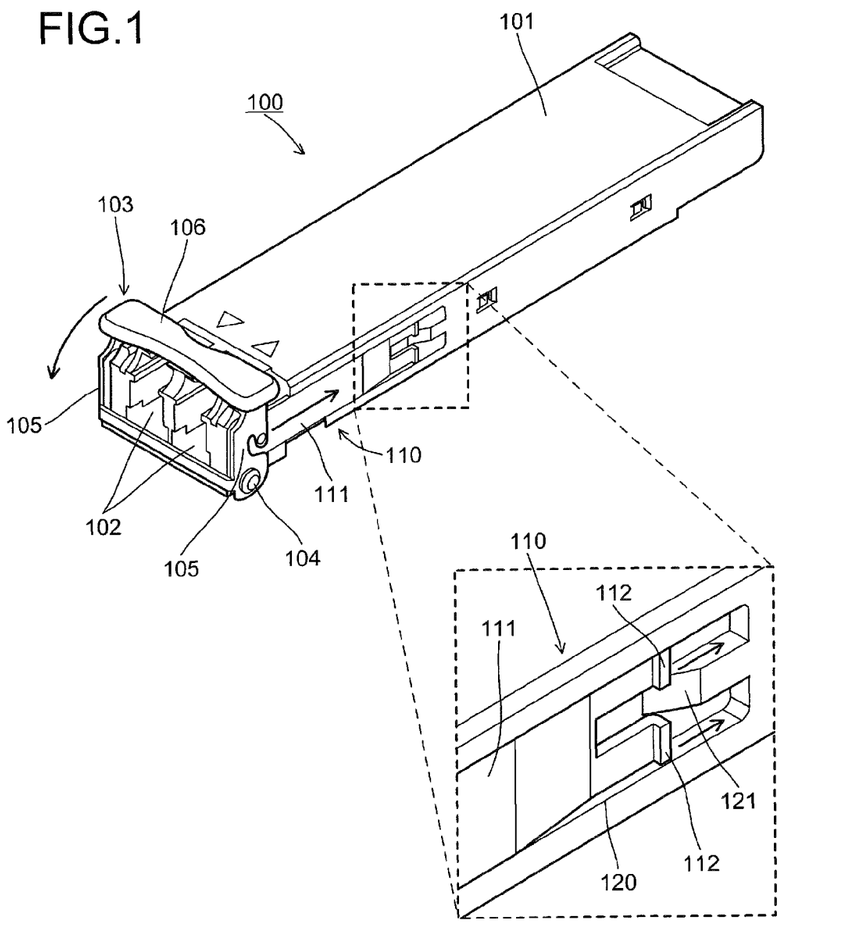
FIG. 1 is a general perspective view of an optical module according to an embodiment.

FIG. 1 is a general perspective view of an optical module according to an embodiment. A state depicted in FIG. 1 is a state when a bail is located at an attachment position. The attachment position is a rotated position of the bail when the optical module is attached to a cage and represents a state in which the bail is located at an initial position.

An optical module 100 has an optical connector 102 disposed in a front part of a shielded case 101. A transmission unit that transmits an optical signal and a reception unit that receives an optical signal are disposed inside the case 101 and the transmission unit and the reception unit transmit/receive optical signals via the optical connector 102.

A bail 103 is freely-rotatably disposed on the front part of the case 101. The bail 103 includes a pair of arms 105 of a predetermined length freely rotatably supported by a shaft 104 positioned at a lower end on the front side of the case 101, and a grip unit 106 for operation connected between the arms 105 and 105. The grip unit 106 is made of material that is not slippery during manual operation such as resin. As depicted in FIG. 1, when located at the attachment position, the bail 103 is positioned on the upper side offset from the front position of the optical connector 102.

A slider 110 is disposed on the both side surfaces of the case 101. The slider 110 has a slide plate 111 freely slidable along a longitudinal direction of the case 101 in conjunction with the rotation of the bail 103. The both side surfaces of the case 101 have a slide groove 120 formed to the extent of the plate thickness of the slide plate 111 and in the longitudinal direction of the case 101, and the slider 110 slides within the slide groove 120 in the longitudinal direction of the case 101.

The slider 110 is coupled at one end (base end) to the bail 103 and slides longitudinally in conjunction with the rotation of the bail 103. The slider 110 has an engagement member 112 disposed at the other end (free end) and the engagement member 112 engages with an engagement member (latch plate) of the cage described later to fixedly hold the attachment state of the optical module 100 to the cage.

Figure 2:
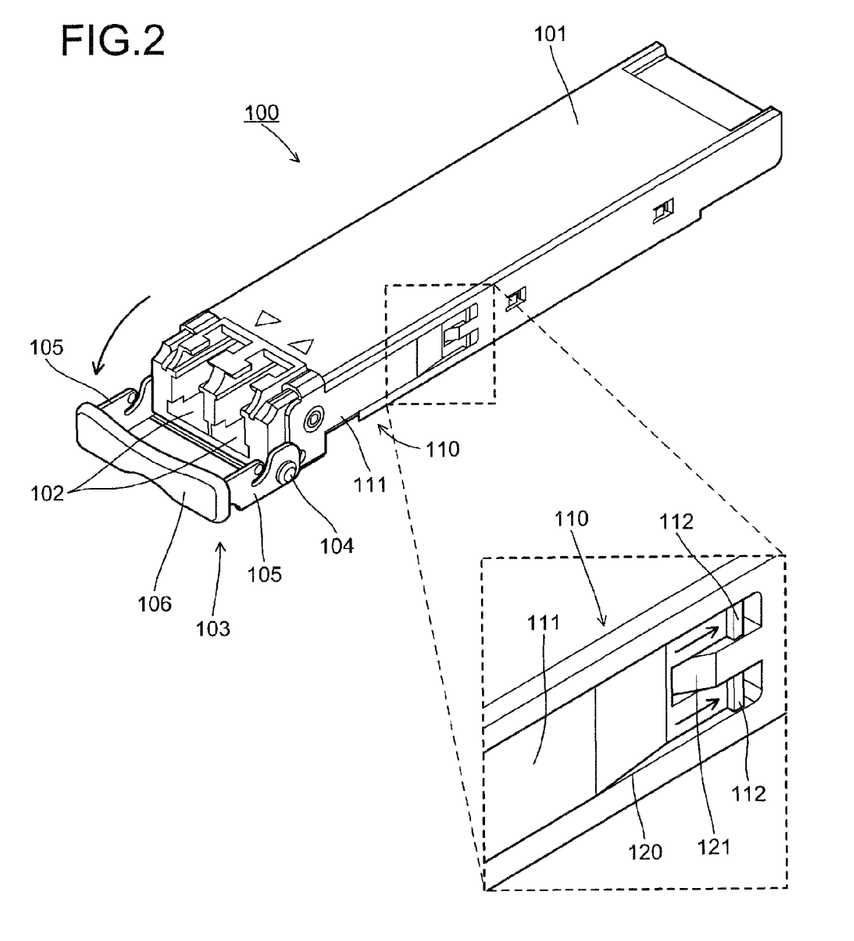
FIG. 2 is a general perspective view of the optical module according to the embodiment.

FIG. 2 is a general perspective view of the optical module according to the embodiment. A state depicted in FIG. 2 is a state when the bail is located at a removal position. The removal position is a rotated position of the bail when the optical module is removed from the cage.

At the removal position, the bail 103 is located on the front side of the optical connector 102 parallel to the pullout direction of the optical module 100. In the case of the removal position, the slider 110 moves toward the rear end within the slid groove 120 in conjunction with the rotation of the bail 103 and the engagement member 112 of the slider 110 is released from the engaged state with the engagement member of the cage.

A slope surface 121 is disposed at the rear end of the slid groove 120. The slope surface 121 is a taper surface having one end on the bottom of the groove of the slid groove 120 and the other end coinciding with the side surface position of the case 101 with height continuously changing in the longitudinal direction of the optical module 100. When the optical module 100 is removed from the cage, the slope surface 121 acts as a disengaging unit coming into contact with the engagement member of the cage and pushing the engagement member outward allowing passage of the engagement member 112 portion (preventing the engagement members from re-engaging with each other).

Figure 3:
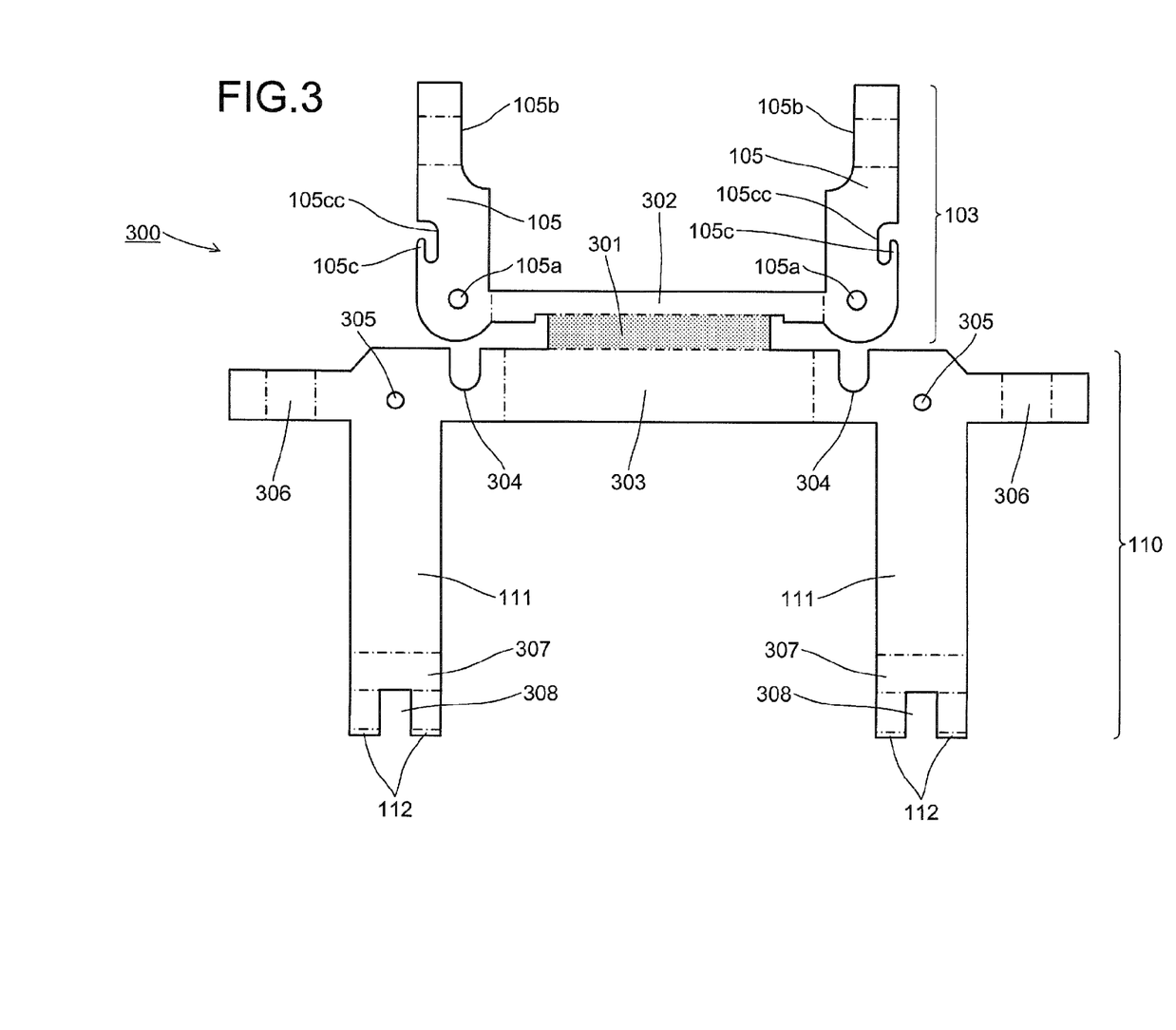
FIG. 3 is an expanded view of an integrated structure of a bail and a slide plate.

FIG. 3 is an expanded view of an integrated structure of the bail and the slide plate. The bail 103 and the slider 110 described above are integrally formed as a bail slider 300 as depicted in FIG. 3. For example, the bail slider 300 is formed by pressing a metal plate of beryllium copper or equivalent material. A spring unit 301 of a predetermined length is formed between the bail 103 and the slider 110 and the spring unit 301 couples the bail 103 and the slider 110.

The bail slider 300 has a plate thickness of 0.5 mm, for example, and the spring unit 301 is formed to have a relatively thin thickness of 0.3 mm or less by locally changing a pressing pressure. The length of the spring unit 301 (length along the width direction of the optical module 100) is greater than or equal to at least 3 mm. The material of the bail slider 300 may be a plastic molding compound and can be liquid crystal polymer that can give a spring property to the spring unit 301 portion.

The bail slider 300 is folded along dashed-dotted lines depicted in FIG. 3 to form the bail 103 and the slider 110. The spring unit 301 has a predetermined curvature when assembled and therefore can transmit a rotating force of the bail 103 to the slide plate 111 while maintaining a spring force. This biasing force biases the bail 103 toward the attachment position (initial position) based on the position of the slide plate 111. The attachment position is a fixedly holding position of the optical module 100. When the bail 103 is rotated to the removal position, the spring unit 301 can retain the spring force and generates a buckling stress not yielding to a thrust force when the slide plate 111 is caused to slide.

Portions described in FIG. 3 will be described. On the bail 103 side, an intermediate body 302 is disposed that is connected to the spring unit 301 and that is connected on the both ends to the arms 105 and 105. A shaft hole 105a is opened at each of the base ends of the arms 105 and 105 for rotatable support by the shaft 104. Folding units 150b and 150b are disposed at the respective leading ends of a pair of the arms 105 and 105, and a grip unit 160 is attached to portions formed by folding the folding units 1005b. A holding unit (stopper) 150c for maintaining the attachment position of the bail 103 is formed in a substantially center portion of the arm 105 (described in detail later). To apply an elastic force of the stopper 105c portion, a groove 105cc forming a space for projecting the stopper 105c portion is disposed around the stopper 105c in the arm 105.

On the slider 110 side, an intermediate body 303 is disposed that is connected to the spring unit 301 and that is connected on the both ends to the slide plates 111 and 111. A base end of the slide plate 111 has a slot-shaped escape groove 304 formed for preventing overlap with the shaft 104 during slide motion. The base end of the slide plate 111 has a holding unit (holding groove) 305 corresponding to a rotated position of the stopper 105c of the bail 103 and engaging with the stopper 105c in a portion of the arm 105 when the bail 103 is at the attachment position. The base end of the slide plate 111 has a sliding contact unit 306 slidably contacting a sliding contact member disposed on the front upper portion of the optical module 100. The sliding contact unit 306 freely slides on the sliding contact member of the optical module 100.

A free end of the slide plate 111 has a spring member 307 for giving a spring force to the engagement member 112 and an escape groove 308 formed into a long groove shape at a center portion with a predetermined length in the longitudinal direction from the end portion so as not to contact with the slope surface 121. The spring member 307 generates the spring force toward the bottom surface of the slide groove 120. The engagement member 112 is formed at two locations in the height direction of the slide plate 111 with the escape groove 308 interposed therebetween.

Figure 4:
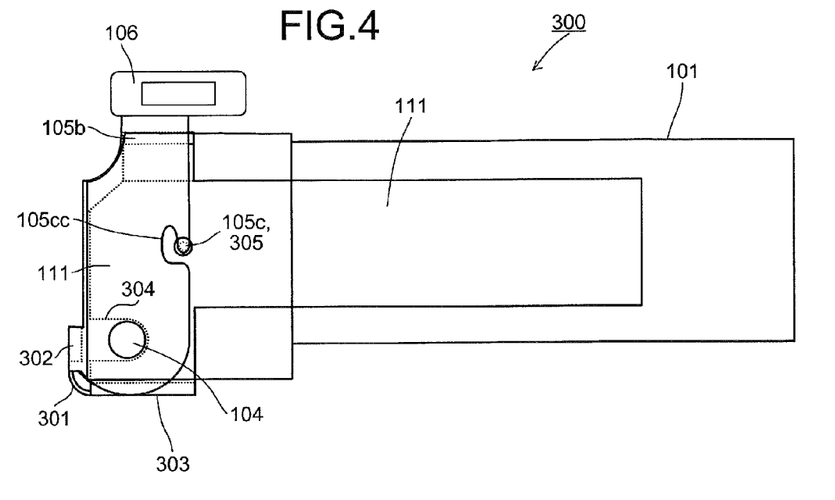
FIG. 4 is a side view of an assembled state of a bail slider.

FIG. 4 is a side view of an assembled state of the bail slider. The bail 103 and the slider 110 can be formed by folding the plate-shaped bail slider 300 depicted in FIG. 3. The spring unit 301 between the bail 103 and the slider 110 is bent into an arc shape in an angular range of 90 degrees as depicted and generates a spring force between the bail 103 and the slider 110.

A stable state of the spring unit 301 of the bail slider 300 is a state depicted in FIG. 4, i.e., a state at the attachment position while the bail 103 is orthogonally positioned in the upper portion of the horizontal slider 110 (90-degree standing state). Therefore, when the bail 103 is rotated to the removal position as depicted in FIG. 2, the spring unit 301 generates a force returning to the attachment position, i.e., the initial state. As described above, the bail slider 300 directly coverts the rotary movement of the bail 103 into the reciprocating movement of the slider 110, and the spring unit 301 disposed between the bail 103 and the slider 110 applies a biasing force for restoration to the initial state (attachment position) between the bail 103 and the slider 110.

When the bail 103 is at the attachment position, the stopper 105c disposed on the arm 105 can engage with and fixedly hold the holding groove 305 portion of the slider 110. As a result, while the optical module 100 is fitted to the cage, since the bail 103 can be prevented from falling to cover the mounting portion of the optical connector 120, the insertion/detachment operation to the optical connecter 102 is not hindered and the operability of the insertion/detachment of the optical connector can be improved.

Figure 5A:
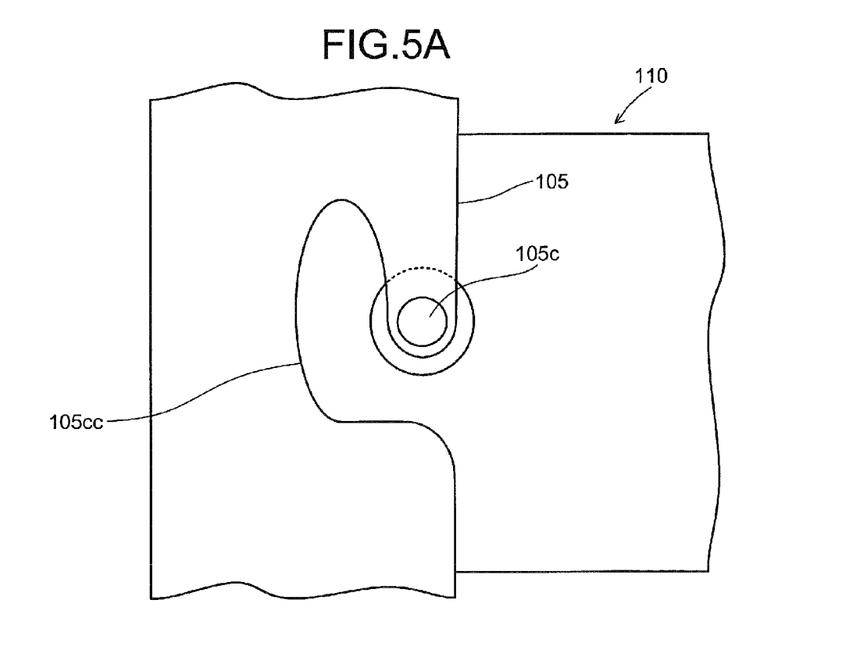
FIGS. 5A and 5B are enlarged views of a stopper.
Figure 5B:
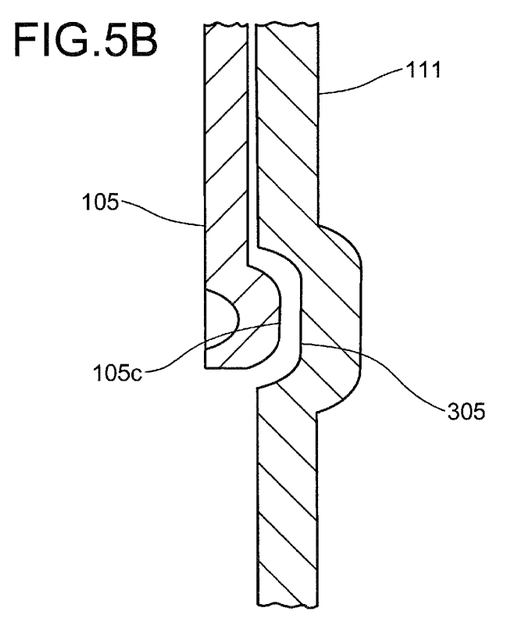

FIGS. 5A and 5B are enlarged views of the stopper. FIG. 5A is an enlarged side view of the stopper and FIG. 5B is an enlarged cross-sectional view of the stopper. As depicted in FIGS. 5A and 5B, the stopper 150c of the bail 103 is formed into a convex shape by locally pressing the arm 105. The holding groove 305 of the slider 110 is correspondingly formed into a concave shape by locally pressing the slide plate 111. As a result, the convex-shaped stopper 105c of the bail 103 can fit into the concave-shaped holding groove 305 of the slider 110 at the attachment position to fixedly maintain this position.

Figure 6A:
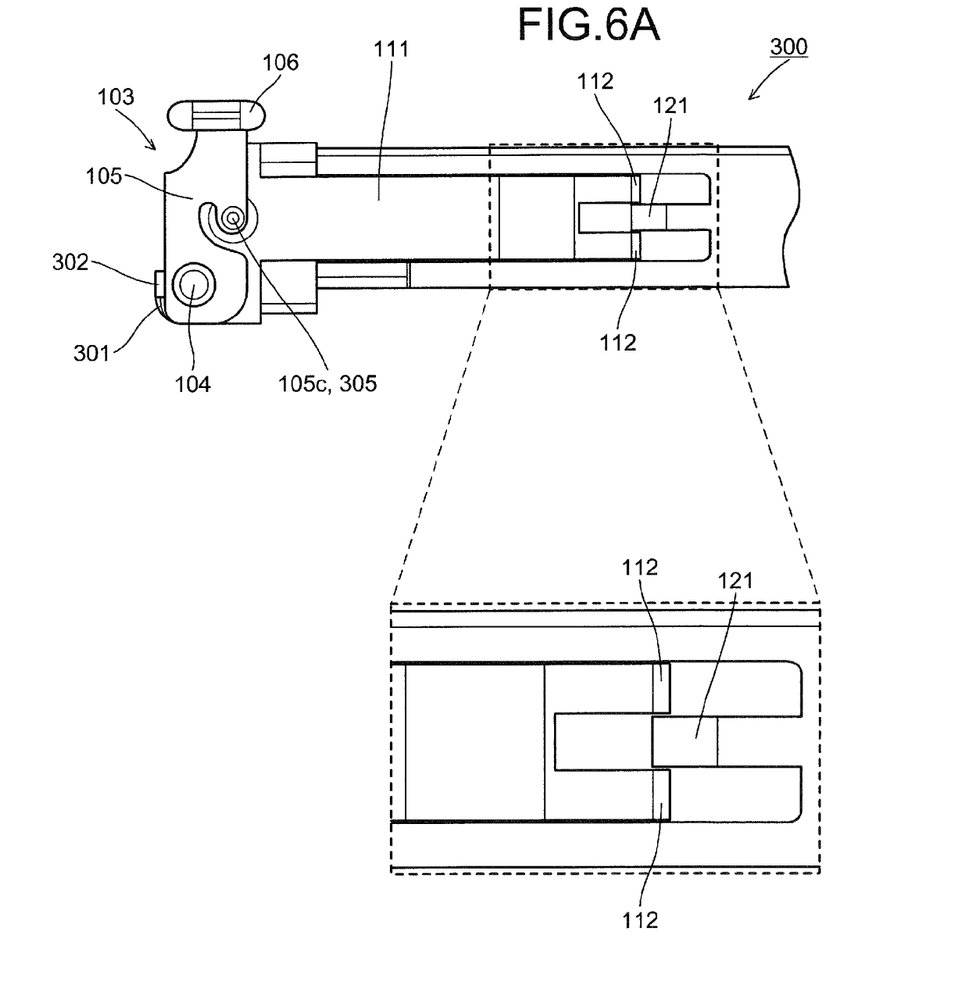
FIGS. 6A and 6B are side views of operation of a bail slider of the optical module.
Figure 6B:
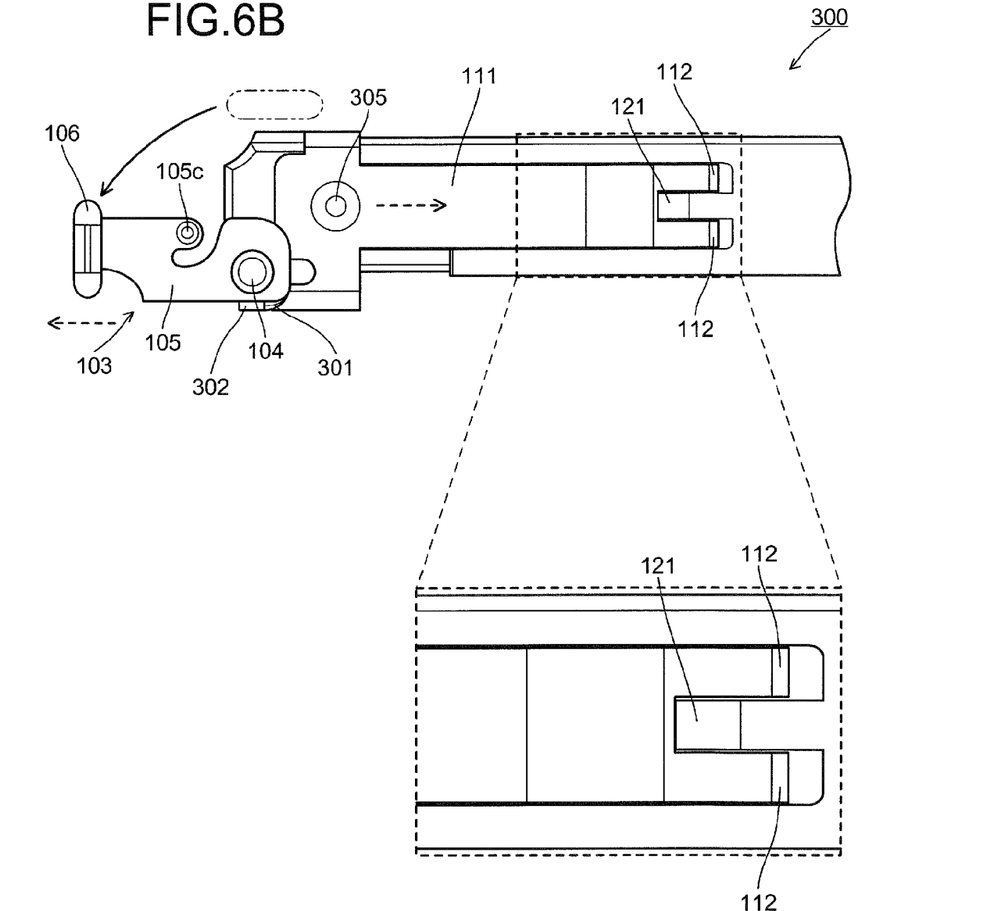

FIGS. 6A and 6B are side views of operation of the bail slider of the optical module. FIG. 6A depicts a state when the bail 103 is rotated to the attachment position i.e., the initial position, and FIG. 6B depicts a state when the bail 103 is rotated to the removal position.

For the attachment position depicted in FIG. 6A, the grip unit 106 disposed on the bail 103 of the bail slider 300 is manually operated and rotated around the shaft 104 to the upper position. As a result, the stopper 105c fits into the holding groove 305 and fixes the position of the bail 103. The spring unit 301 is biased toward the attachment position and the bail 103 can stably maintain the attachment position. In this state, the slide plate 111 is moved via the spring unit 301 to the front side. The engagement member 112 of the slide plate 111 is located closer to the front part relative to the position of the slope surface 121.

On the other hand, for the removal position depicted in FIG. 6B, the grip unit 106 disposed on the bail 103 of the bail slider 300 is manually operated and rotated around the shaft 104 to the front part of the optical module. In this case, the stopper 105c is disengaged from the holding groove 305 of the stopper 105c. As the bail 103 is rotated, the intermediate body 302 is moved toward a rear portion of the optical module 100. This movement amount causes the slide plate 111 to move toward the rear portion via the spring unit 301. As a result, the engagement member 112 of the slide plate 111 is located in the rear portion relative to the slope surface 121. Since a force opposite to the biasing force is applied, the spring unit 301 generates a force returning toward the attachment position.

Figure 7A:
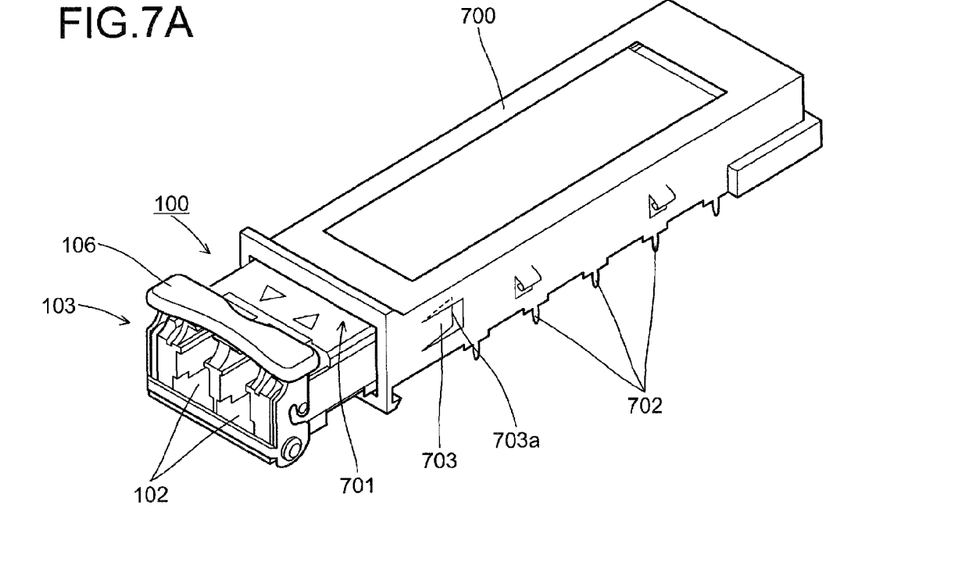
FIGS. 7A and 7B are perspective views of an insertion/detachment state of the optical module into/from the cage.
Figure 7B:
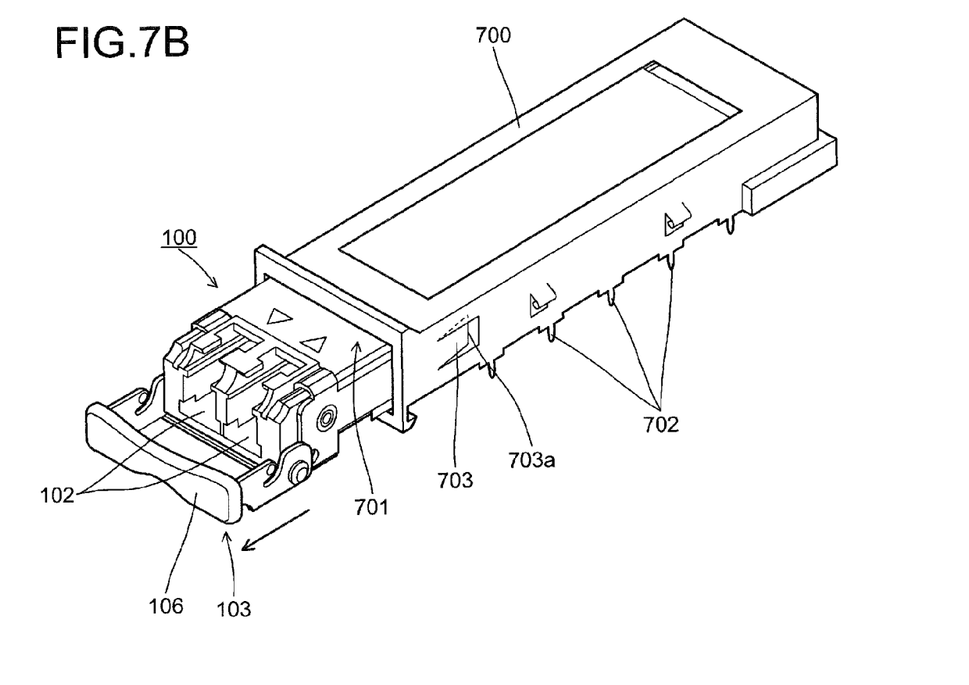

FIGS. 7A and 7B are perspective views of an insertion/detachment state of the optical module into/from the cage. A cage 700 is a shielded frame housing the optical module 100 from an opening portion 701 in a front part in a manner enabling insertion/detachment. The cage 700 has a plurality of pins 702 disposed on the bottom portion and inserted into a substrate not depicted and is fixed to the substrate by soldering etc. A connector is disposed inside the cage 700 and electrically connected to the optical module 100.

An engagement member (latch plate) 703 that engages with the engagement member 112 of the optical module 100 is disposed in the both side potions of the cage 700. This latch plate 703 is formed by making a substantially U-shaped cut in the side surface of the cage 700 and folding the side surface into a sloped shape such that a rear end portion 703a is retained in a state of projecting inside the cage 700 (toward the optical module 100). The latch plate 703 opens outward while a force is applied from the inside (side surface of the optical module 100); however, when the force is not applied, the latch plate 703 returns to the original state (the state of projecting inside the cage 700) due to a spring force.

As depicted in FIG. 7A, the optical module 100 can be attached to the cage 700 by simply pushing the optical module 100 to the inside through the opening potion 701 of the cage 700 with the bail 103 rotated to the attachment position. As a result, the engagement member 112 of the optical module 100 can engage and fixedly hold the latch plate 703 of the cage 700 (details of the engaged state rill be described later). FIG. 7A depicts a state in which the optical module 100 is attached to the cage 700 at a prescribed position. A mating connector of an optical fiber etc., is subsequently inserted into the optical connecter 102 to enable transmission/reception of optical signals.

Even when the bail 103 is rotated to the removal position, the optical module 100 can be attached to the cage 700. In this case, after the optical module 100 is pushed into the cage 700 to the prescribed position, the bail 103 is rotated to the attachment position and the optical module 100 can be fixedly held to the cage 700.

As depicted in FIG. 7B, the optical module 100 may be removed from the cage 700 by hooking the grip unit 106 by a finger etc., with the bail 103 rotated to the removal position and by pulling out the optical module 100 to the front part of the cage 700.

Figure 8A:
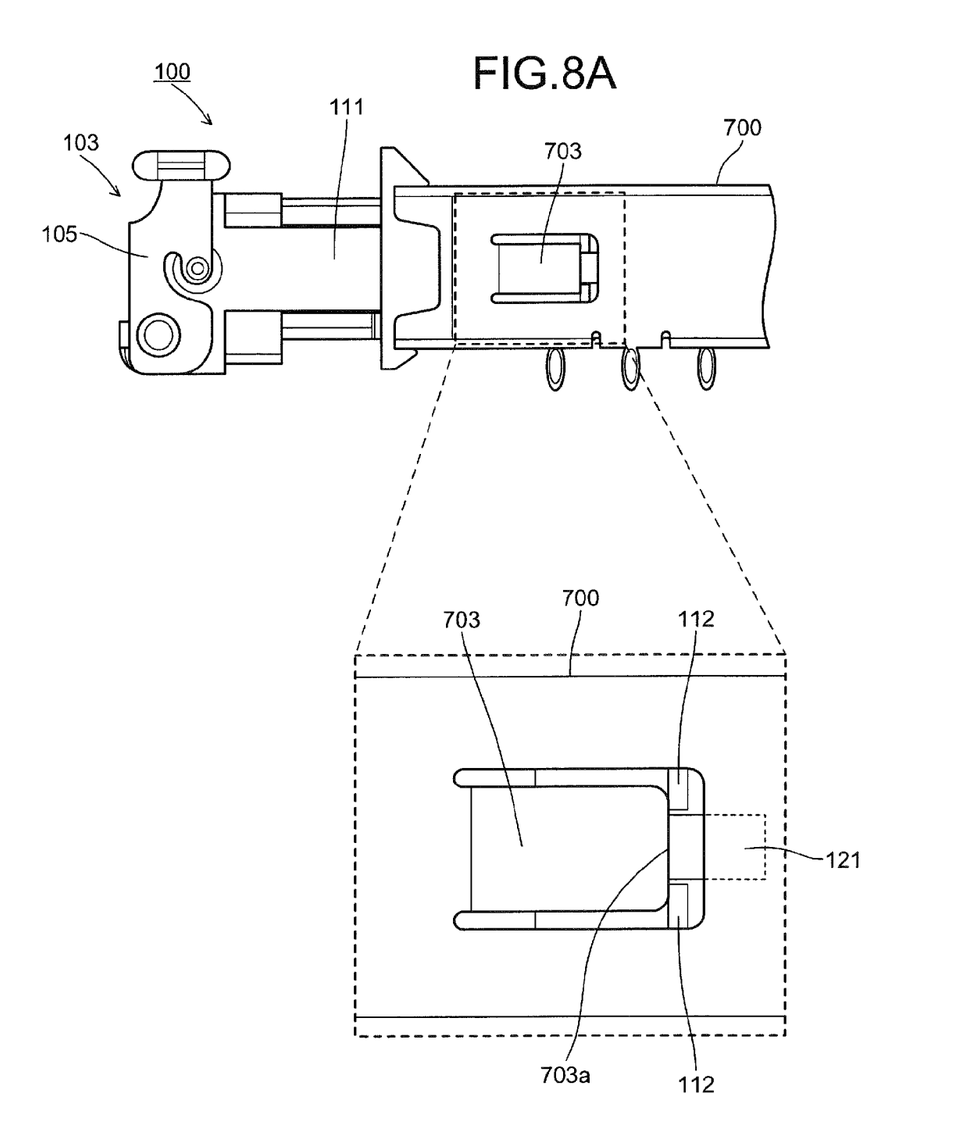
FIGS. 8A, 8B, and 8C are side views of engagement and engagement release motion of the optical module for the cage.
Figure 8B:
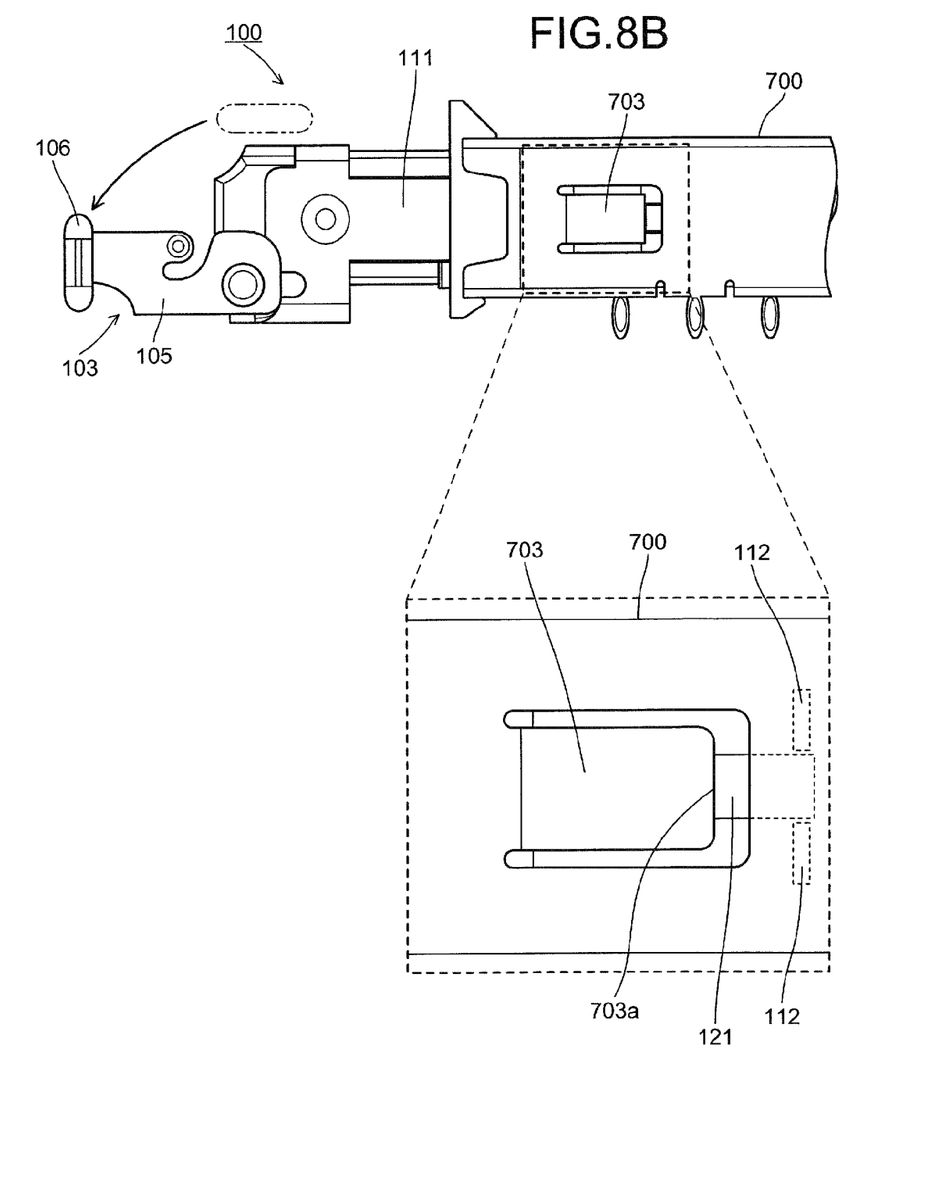
Figure 8C:
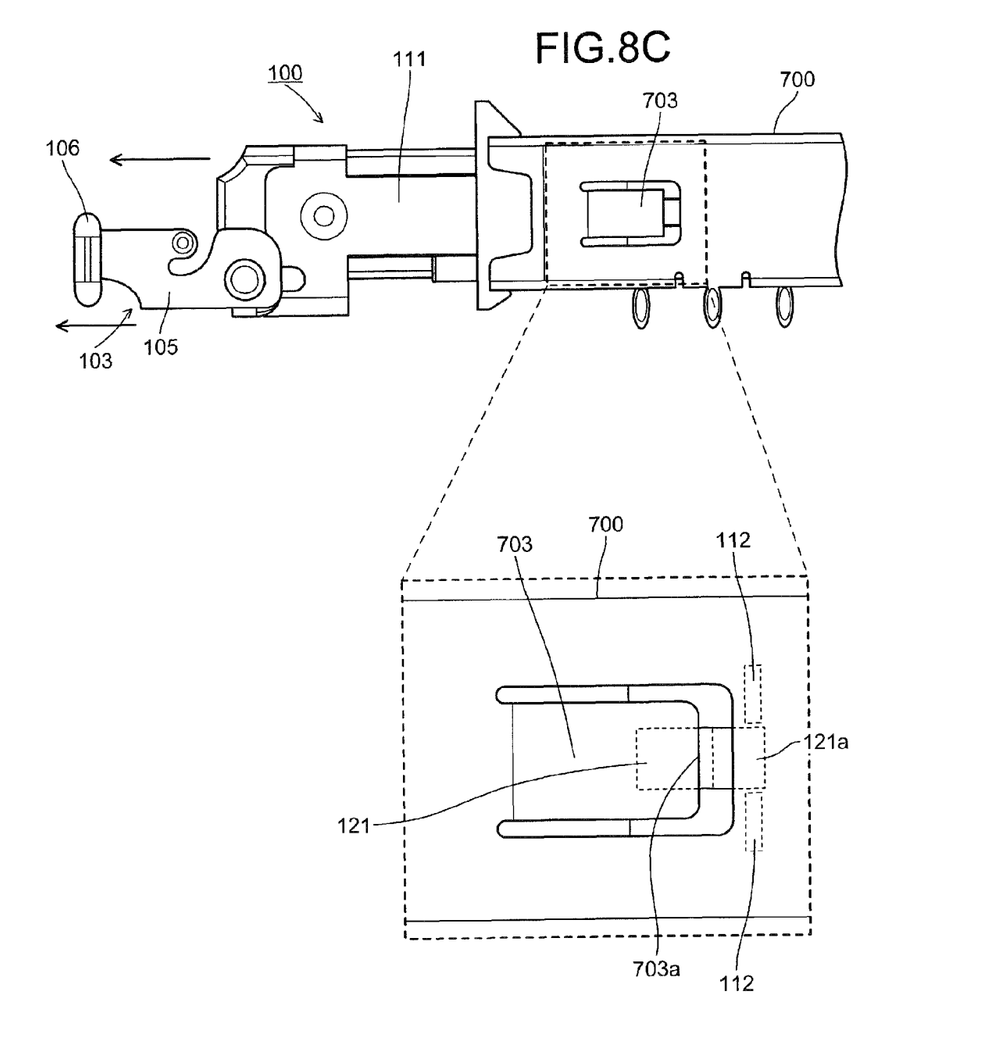

FIGS. 8A to 8C are side views of engagement and engagement release motion of the optical module for the cage. FIG. 8A is a side view of a fixed state of the optical module to the cage. When the optical module 100 is attached to the cage 700, as depicted in FIG. 8A, the optical module 100 may simply be pushed and fitted into the cage 700.

As depicted in FIG. 8A, while the bail 103 is located ate the attachment position, the engagement member 112 of the slide plate 111 engages with the end portion 703a of the latch plate 703. As a result, the attachment position of the optical module 100 to the cage 700 can fixedly maintained. Since the end portion 703a of the latch plate 703 also enters into and engages with the front side of the engagement member 112, the optical module 100 can be prevented from coming out of the cage 700.

The engagement release motion of the optical module from the cage will be described. This engagement release can be performed with the following simple operation.
1. The bail 103 is rotated to the removal position (FIG. 8B).
2. The optical module 100 is removed (FIG. 8C).

FIG. 8B is a side view of the engagement release motion of the optical module from the cage. When the bail 103 is rotated to the removal position in the fixed state of the optical module 100 depicted in FIG. 8A, the slide plate 111 slides to the rear portion and the engagement member 112 of the slide plate 111 is released from the engaged state with the end portion 703a of the latch plate 703 of the cage 700 and is located at a predetermined distance away from the end portion 703a toward the rear portion.

FIG. 8C is a side view of the engagement release motion of the optical module from the cage. After the operation of FIG. 8B, by holding the grip unit 106 and pulling out the optical module 100 toward the front of the cage 700, the optical module 100 is entirely moved to the front side. As a result, the latch plate 703 of the cage 700 is gradually pushed out along the slope of the slope surface 121 to the outside of the cage 700.

A rear position (reference numeral 121a in FIG. 8C) of the slope surface 121 is on the same plane as the side surface of the case 101 of the optical module 100 and the engagement member 112 of the slide plate 111 is housed inside the slide groove 120 concaved from the side surface of the case 101. Therefore, by pulling out the optical module 100 continuously after the state depicted in FIG. 8C, the engagement member 112 can pass over the latch plate 703 portion without engaging with the latch plate 703 of the cage 700. As a result, the optical module 100 can be removed from the cage 700.

Figure 9A:
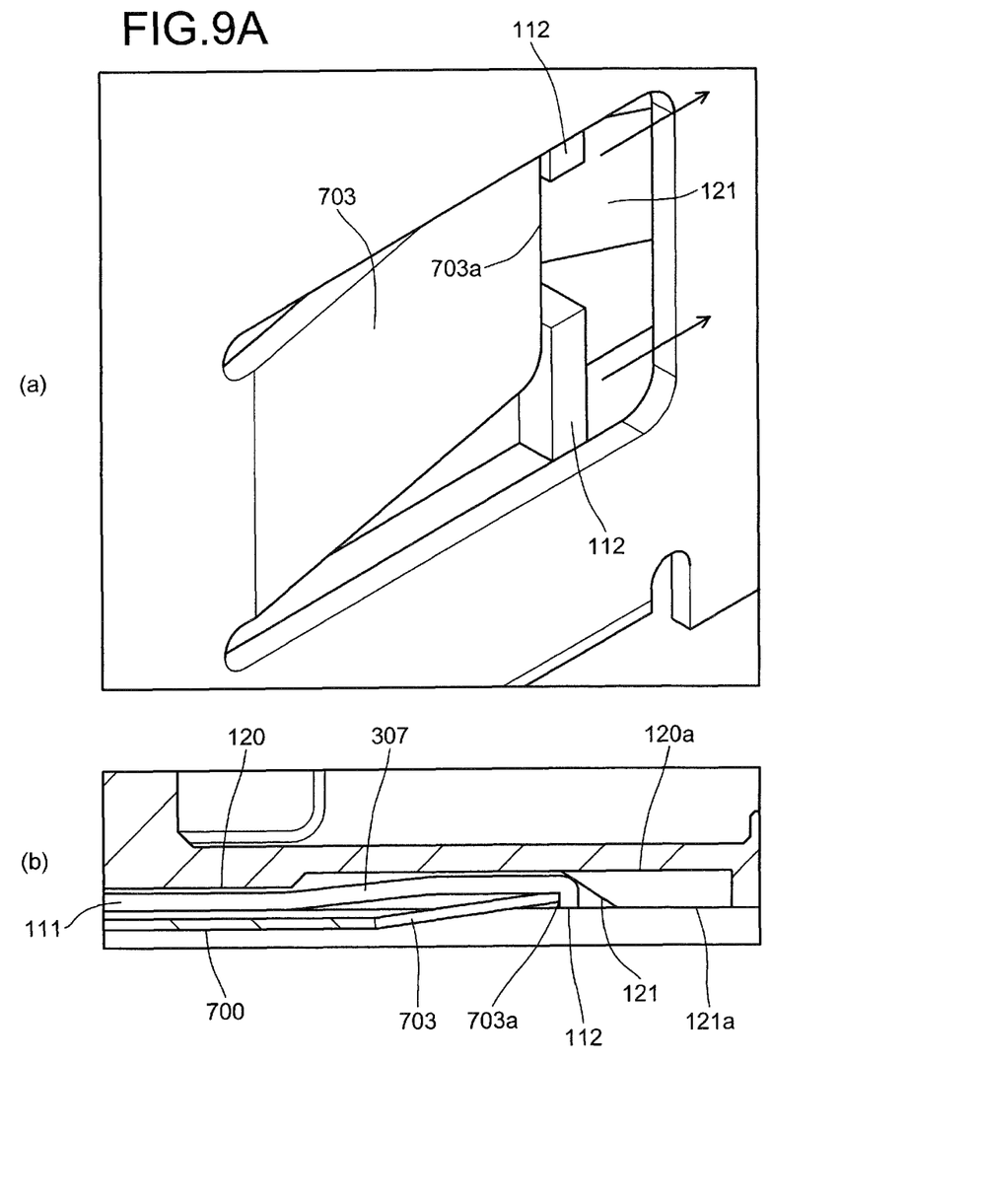
FIGS. 9A, 9B, and 9C are enlarged views of engagement and engagement release motion of the optical module for the cage.
Figure 9B:
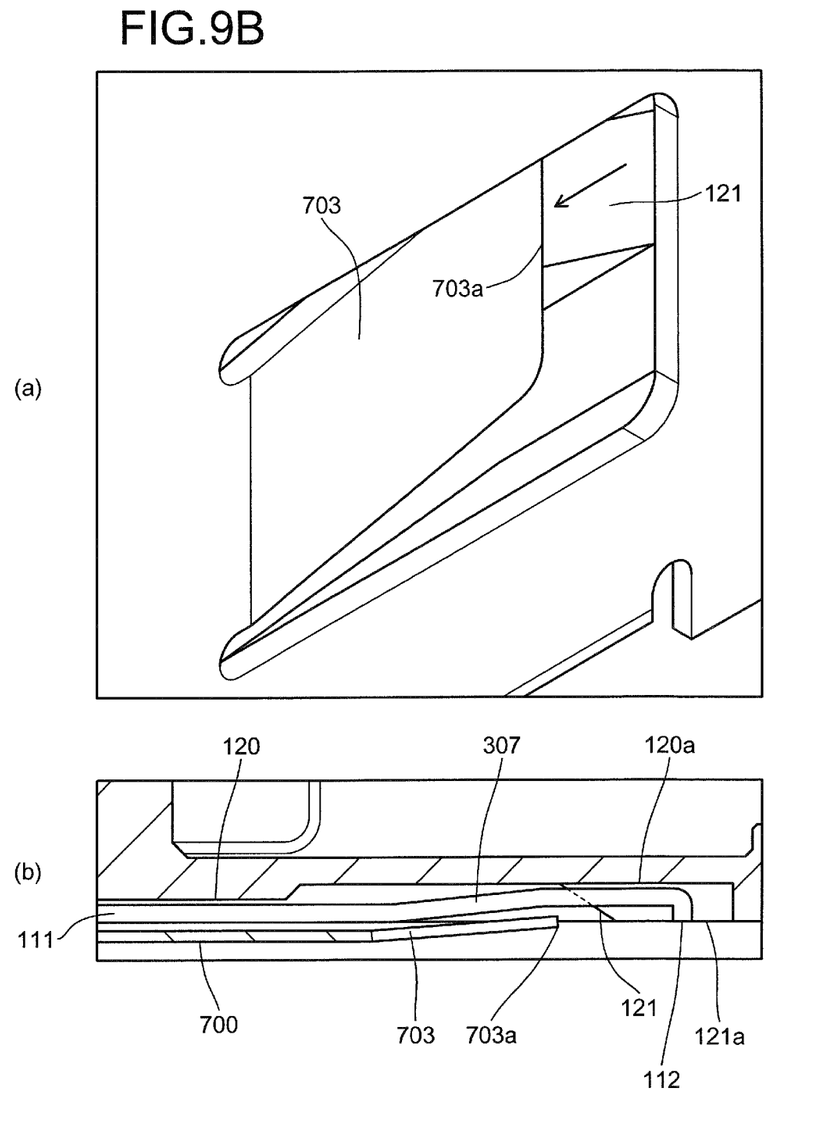
Figure 9C:
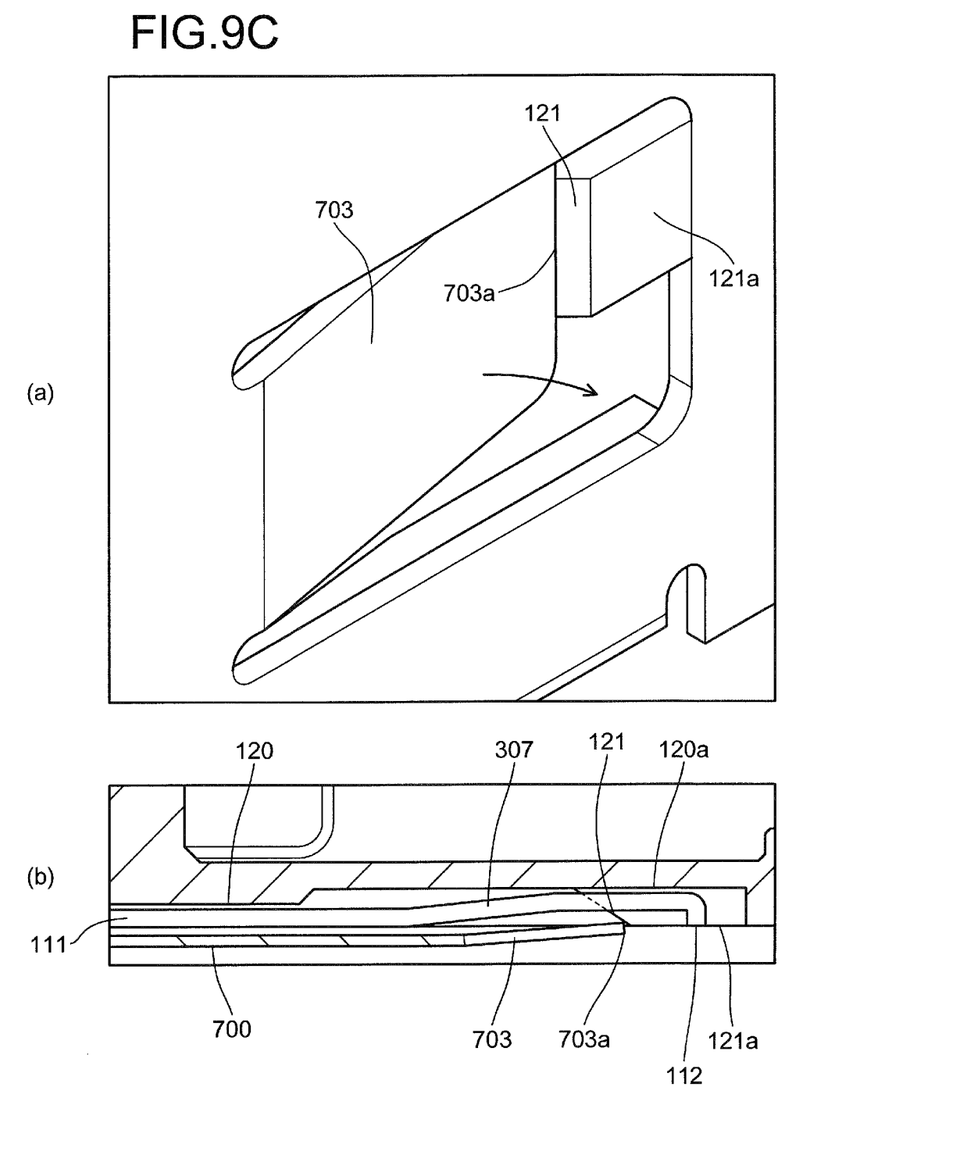

FIGS. 9A, 9B, and 9C are enlarged views of engagement and engagement release motion of the optical module for the cage. FIGS. 9A to 9C are enlarged views corresponding to FIGS. 8A to 8C, respectively. In each of FIGS. 9A to 9C, (a)

is a partially enlarged perspective view and (b) is a partially enlarged plane cross-sectional view.

As depicted in (b) of FIGS. 9A to 9C, the slide groove 120 formed in the side surface of the case 101 of the optical module 100 has a stepped groove 120a formed in the rear portion and made deeper by one step. The stepped groove 120a has a longitudinal length set to a length corresponding to an amount of slide of the slide plate 111 due to the rotation of the bail 103. The depth of the stepped groove 120a corresponds to the height (amount of projection due to folding) of the engagement member 112 of the slide plate 111. The engagement member 112 is biased to be housed within the stepped groove 120a by the spring fore of the spring member 307 of the slide plate 111. As a result, the engagement member 112 does not project from the slide groove 120 (strictly, the stepped groove 120a) and is maintained in a state without projecting from the side surface of the case 101 of the optical module 100.

As depicted in FIG. 9A, while the optical module 100 is fitted into the cage 700, the end portion 703a of the latch plate 703 of the cage 700 inclines toward the side surface of the case 101 of the optical module 100 and engages with the engagement member 112 of the slide plate 111. As a result, the movement of the optical module 100 to the front side relative to the cage 700 can be prohibited and the optical module 100 can be prevented from coming off and can fixedly be held.

The engagement member 112 of the slide plate 111 has a spring property as depicted in FIG. 9A and the engagement member 112 inclines toward the stepped groove 120a as depicted at the location disposed with the stepped groove 120a. When the optical module 100 is fitted into the cage 700, the engagement member 112 is on the same plane as the slide plate 111 while passing through the slide groove 120 portion and moves to the rear portion in the slide groove 120 portion.

As depicted in FIG. 9B, when the optical module 100 is removed from the cage 700, first, the bail 103 is rotated to the removal position to slide the slide plate 111 to the rear portion and the engagement member 112 of the slide plate 111 is released from the engaged state with the end portion 703a of the latch plate 703 of the cage 700. The engagement member 112 is located at a predetermined distance away from the end portion 703a of the latch plate 703 toward the rear portion.

As depicted in FIG. 9C, by holding the grip unit 106 and pulling out the optical module 100 toward the front of the cage 700, the optical module 100 is entirely moved to the front side. As a result, the latch plate 703 of the cage 700 is gradually pushed out to the outside of the cage 700 as the end portion 703a slides up along the slope surface 121.

The rear position (reference numeral 121a in FIG. 9C) of the slope surface 121 is on the same plane as the side surface of the case 101 of the optical module 100 and the engagement member 112 of the slide plate 111 is housed inside the slide groove 120 concaved from the side surface of the case 101. Therefore, by pulling out the optical module 100 continuously after the state depicted in FIG. 9C, the engagement member 112 can pass over the latch plate 703 portion without engaging with the latch plate 703 of the cage 700. As a result, the optical module 100 can be removed from the cage 700.

After the optical module 100 is removed from the cage 700, the arms 105 of the bail 103 can be held in the holding groove 305 by the force for restoration to the attachment state, i.e., the initial state, due to the spring force of the spring unit 301.

According to the embodiment, since the bail 103 and the slider 110 are integrally formed as the bail slider 300, the number of components can be reduced and the bail 103 and the slider 110 can easily be manufactured by simply folding the integrated bail slider 300. The bail slider 300 has a simple structure directly converting the rotary movement of the bail 103 into the reciprocating movement of the slider 110, eliminates the need for using a cam, a cam groove, etc., can achieve the reduction in the number of components and the improvement in yield, and makes the assembly easier.

Since the bail 103 returns to the attachment position due to the spring force of the spring unit 301, the bail slider 300 can always fixedly hold the bail 103 at the attachment position while the optical module 100 is removed from the cage 700. Therefore, the optical module 100 can be fitted into the cage 700 any time, can eliminate the operation of manually returning the bail 103 to the initial state, and can improve the operability.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical module comprising:
   a rotating bail disposed on a front part of a case that is inserted into and removed from a cage;
   a slide plate that slides along a longitudinal direction of the case in conjunction with rotation of the bail; and
   an engagement member is disposed on the slide plate, freely engages with an engagement member of the cage, and is released from an engaged state by a sliding of the slide plate in conjunction with rotation of the bail,
   wherein the bail and the slide plate are integrally formed as a bail slider formed by pressing a metal plate.

2. The optical module according to claim 1, wherein the bail and the slide plate are integrated via a spring unit having a relatively thin thickness.

3. The optical module according to claim 2, wherein the spring unit generates a predetermined spring force between the bail and the slide plate for biasing such that the bail forms a predetermined angle to the slide plate.

4. The optical module according to claim 3, wherein the spring unit generates a predetermined spring force between the bail and the slide plate to bias the bail toward a position offset from a position in a front portion of an optical connector disposed on the front part of the case.

5. The optical module according to claim 3, wherein the bail and the slide plate are disposed with respective holding portions maintaining a position at the predetermined angle.

6. The optical module according to claim 1, wherein the case has a slope surface preventing the engagement member of the optical module from engaging with the engagement member of the cage when the case is removed from the cage after the sliding of the slide plate.

7. The optical module according to claim 1, wherein the bail and the slide plate are integrated by a metal material.

8. The optical module according to claim 1, wherein the bail and the slide plate are integrated by a plastic molding compound.

9. An optical module comprising:
   a rotating bail disposed on a front part of a case that is inserted into and removed from a cage;

a slide plate that slides along a longitudinal direction of the case in conjunction with rotation of the bail; and an engagement member that is disposed on the slide plate, freely engages with an engagement member of the cage, and is released from an engaged state by a sliding of the slide plate in conjunction with the rotation of the bail, the bail and the slide plate being formed by an integrated metal plate in a folded state, wherein the case has a slope surface preventing the engagement member of the optical module from engaging with the engagement member of the cage when the case is removed from the cage after the sliding of the slide plate.

\* \* \* \* \*